United States Patent [19]
Küspert

[11] Patent Number: 4,753,119
[45] Date of Patent: Jun. 28, 1988

[54] DRIVE FOR BACKLASH-FREE CONVERSION OF MOTION

[75] Inventor: Max Küspert, Marktredwitz, Fed. Rep. of Germany

[73] Assignee: Hamül Werkzeugfabrik,Th. Kirschbaum KG, Marktredwitz, Fed. Rep. of Germany

[21] Appl. No.: 860,109

[22] Filed: May 6, 1986

Related U.S. Application Data

[63] Continuation-in-part of PCT DE85/00294, filed Aug. 27, 1985, published as WO86/01869 on Mar. 27, 1986.

[30] Foreign Application Priority Data

Sep. 7, 1984 [DE] Fed. Rep. of Germany ... 8426813[U]

[51] Int. Cl.⁴ .............................. F16H 19/06
[52] U.S. Cl. .................. 74/89.21; 74/89.22; 74/422
[58] Field of Search ............ 74/89.22, 422, 89.21; 198/811

[56] References Cited

U.S. PATENT DOCUMENTS

| | | | |
|---|---|---|---|
| 3,151,494 | 10/1964 | Sedgewick | 74/409 |
| 3,399,578 | 9/1968 | Lindabury et al. | 74/422 |
| 3,824,871 | 7/1974 | Loesch et al. | 74/422 |
| 3,850,043 | 11/1974 | Tarbox | 74/89.2 |
| 3,889,801 | 6/1975 | Boyer | 198/811 X |
| 4,570,617 | 2/1986 | Baus | 74/422 |

FOREIGN PATENT DOCUMENTS

| | | |
|---|---|---|
| 1059756 | 6/1959 | Fed. Rep. of Germany . |
| 2729019 | 1/1978 | Fed. Rep. of Germany . |
| 2910373 | 9/1980 | Fed. Rep. of Germany . |
| 2219342 | 9/1974 | France . |
| 2130682 | 6/1984 | United Kingdom . |

*Primary Examiner*—Thomas F. Callaghan
*Attorney, Agent, or Firm*—Erwin S. Teltscher

[57] ABSTRACT

A drive mechanism is provided for backlash-free conversion of a rotary motion into a linear motion with the aid of a toothed belt and of a drive gear, in particular for a quick and reproducible positioning of tools or tool tables. At least one gear rack adjustable in one direction is present. Arcuate guides are provided at the two sides of the drive gear. The arcuate guides maintain the toothed belt in such engagement with the gear rack that one section receives the load and only a short, defined section of the toothed belt is disengaged from the teeth. Furthermore, the toothed belt is provided as an endless loop.

14 Claims, 3 Drawing Sheets

DRIVE FOR BACKLASH-FREE CONVERSION OF MOTION

CROSS-REFERENCE TO RELATED APPLICATIONS

This application is a continuation-in-part application of another international application filed under the Patent Cooperation Treaty on Aug. 27, 1985, bearing Application No. PCT/DE85/00294, and listing the United States as a designated country. The entire disclosure of this latter application, including the drawings thereof, is hereby incorporated in this application as if fully set forth herein.

BACKGROUND OF THE INVENTION

1. Field of the Invention

The present invention relates to a drive device for backlash-free conversion of rotary motion into linear motion by use of a toothed belt and of a drive gear positioned to engage the two belts.

2. Brief Description of the Background of the Invention Including Prior Art

High requirements are associated with the capacity and accuracy of measurement and tool machines where slides, supports, tools or tool tables perform linear motions and with machines with cross support slides that perform simultaneous motions in the directions of two coordinates. In these cases, the linear motions are not only to be performed rapidly, that is, with large acceleration and deceleration values, but also with highest accuracy in order to maintain desired production tolerances. Finally, the motion of these machine parts is to be free of slippage, to be free of backlash and play, and to be free of vibrations in order to allow mass production under reproducible conditions with the aid of numeric controls. The requirements lead in practical terms, because of the high loading of the component parts of the linear drive, to undesired wear and tear, which result in the long run in inaccuracies and scattering during the numeric positioning of the slides or tools. The known and usually employed drive systems for the performance of linear adjustment motion, which, for example, comprise threaded spindles, screws, recirculating ball nut and screw drives, gear racks, hydraulic or pneumatic pistons or toothed belts. These systems and devices are all applied because of their properties and, in fact, as is understandable, always where based on the requirements their favorable properties are used to especial advantage.

However, when the question arises of providing linear drive where all conditions are fulfilled to a very high degree, for example, in case of a large adjustment path under large adjustment speed, for example, 1.0 m/sec, then it is difficult to obtain a backlash-free, vibration-free and accurate positioning. In particular, this is difficult especially in continuously repetitive runs. Thus, for practical purposes, all known drive systems are eliminated despite their specific advantages because their application under the conditions described increases their disadvantages to such an extent that such linear drive for an optimum solution for the requirements is hopeless from the beginning.

Systems of this kind comprise at least one gear rack running in an adjustment direction. The two sides of the drive gear are provided with arcuate guides, which maintain the toothed belt in such engagement with the gear rack that a section accepts the load and only a short defined section of toothed belt remains out of engagement with the teeth and where furthermore the toothed belt is provided as an endless loop. Such a drive is known for example, in principle, from the German Pat. No. 2910373.

A device is taught in U.S. Pat. No. 3,824,871 where a container is placed in a back and forth motion by means of a chain drive actuated by chain gears. This is employed for a relatively uniform distribution of spread bulk materials in a storage space. Precision motion and precision positioning cannot be achieved with this known device. In particular, during a change in the direction of motion in this device, the required play between the elements engaging each other is substantially interfering.

The drive device operating with a toothed belt taught in U.S. Pat. No. 3,850,043 comprises a separate adjustment provision for eliminating the backlash of the toothed belt. The backlash between the toothed belt and the gear rack however cannot be eliminated with this additional element. It is in addition, a disadvantage of this device that depending on the length of the toothed belt, that is, depending on the position of the slide, there occur different changes in length of the toothed belt under the same force action. Thus inaccuracies in positioning result, which cannot be tolerated in case of a numerically controlled machine tool.

SUMMARY OF THE INVENTION

1. Purposes of the Invention

It is an object of the present invention to provide a drive device for the backlash-free conversion of rotation into linear motion, which allows the movement of tools, slides or other elements to be positioned up to very large distances without backlash and slippage.

It is another object of the present invention to provide a drive device with low mass inertia, which can be linearly moved with high positioning accuracy.

It is yet another object of the present invention to provide a drive device that is particularly easy to service and to maintain and is reliable in its ability for position control.

These and other objects and advantages of the present invention will become evident from the description which follows.

2. Brief Description of the Invention

The present invention provides a drive transmission for backlash-free mechanical energy transfer between rotational and linear motion comprising a first deflection roller disposed in parallel to a second deflection roller and a drive gear whose axis is disposed about in parallel to the direction of the deflection rollers and which is at a closer distance to each drive than the drives are to each other. An endless toothed belt surrounds with its back side the surface of each of the two rollers in a force transmitting way at least over an angle of about 180 degrees and engages the drive gear with its front side in such a way that its back side in the area of the contact with the drive gear and most remote from the two rollers it is disposed between a plane spanned by the axes of the two rollers and a tangential plane spanned by the two rollers at a location going in the direction from the gear axis to the contacting of the toothed belt with the drive gear. A toothed rack is disposed relatively close to and has its teeth directed toward the above cited tangential plane to engage the toothed belt in such a way that only a relatively small section of the toothed belt is not provided with a positive locking or force transmitting support.

The toothed rack can run quickly and repeatably in an adjustment direction of a tool and is in constant engagement with the toothed belt. Arcuate guides can maintain the gear belt in such engagement with the toothed gear that a certain section receives the load generated by the toothed rack and that only certain short second sections are without engagement with the teeth or without back support.

The drive gear can be limited in axial direction at least on one side by a cylinder roller that has a slightly larger diameter than an addendum circle of the drive gear and that can roll on one of the deflection rollers.

The axes of the deflection rollers can be connected to each other by a frame, where the frame can be rigid, but movable to different height levels. A hinged frame can be employed to allow for changing the distances between the axes. The axis of the drive gear can be connected to a frame.

The engagement region between the toothed belt and the toothed rack can include an additional press-on stage, which presses the toothed belt from its backside into the teeth of the toothed rack. The press-on stage can be provided with air nozzles providing for an air cushion at its contacting surface. Contact pressure generating rollers can be employed for maintaining the toothed belt disposed at the toothed rack.

The teeth of the toothed belt can have small gearing angles. The gear belt can be provided with teeth having essentially convex semicircular cross-sections.

The diameter of the gear wheel can be from about 0.5 to 1 times the diameter of the deflection rollers.

Another aspect of the present invention provides a drive transmission for backlash-free mechanical energy transfer between rotational and linear motion, which has a gear drive with a rotation axis next to a first deflection roller with a rotation axis. A second deflection roller with a rotation axis is disposed next to the gear drive such that the angle between lines providing a nearest connection between the gear drive axis and the first roller axis and the gear drive axis and the second roller axis form an obtuse angle. An endless toothed belt runs with its back side in rolling contact with the respective rollers, and one belt connection between the rollers engages the teeth of the gear drive with its front side such that the above recited lines approximately correspond to a transition of engagement of the toothed belt between the gear drive and a respective roller. The second belt connection between the rollers runs with the back side of the belt approximately along a tangential plane jointly defined by the surfaces of the two rollers. A gear rack engages the front side of the toothed belt in an area corresponding to the belt's motion along said tangential plane.

Means can be provided for pressing the toothed belt against the gear rack in the area of the tangential plane between the surfaces of the rollers and can, for example, be provided by an air flow exiting from nozzles or by support rollers having an axis running approximately in parallel with the axis of the deflection rollers.

Toothed belts, in particular, toothed belts made from plastic, can be produced with high accuracy with regard to the shape and pitch of the teeth. These toothed belts are sufficiently flexible, they are stable against wear, are low-noise devices and have a favorable degree of efficiency. They are produced in an endless loop and can be provided both with a steel wire core as well as with a glass fiber reinforcement.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

The present invention provides a drive device for backlash-free conversion of a rotary motion into a linear motion with the aid of a toothed belt 11 and a drive gear 14 engaging the toothed belt 11, where at least one gear rack 10 is present running in a desired motion direction. The gear rack 10 is constantly engaging the toothed belt 11. Arcuate guides are provided on two sides of the drive gear 14 to maintain the toothed belt 11 in such engagement with the gear rack 10 that a certain section B assumes the load and only a short defined section D of the toothed belt 11 remains without engagement with a guide or counter teeth. The endless loop of the toothed belt 11 force transmittingly surrounds two deflection rollers 12, 13 with its back side. A drive gear 14 engages the toothed belt 11 from the side of the loop remote from the gear rack 10 such that only a negligibly small section D of the toothed belt 11 is not provided with a positive locking or force-transmitting support.

A pressurizing means can be disposed next to the toothed belt in the engagement area between belt and gear rack to press the teeth of the belt into the teeth of the gear rack. Contact rollers can be disposed against the rear side of the toothed belt for maintaining the belt against the gear rack.

Figure 1:
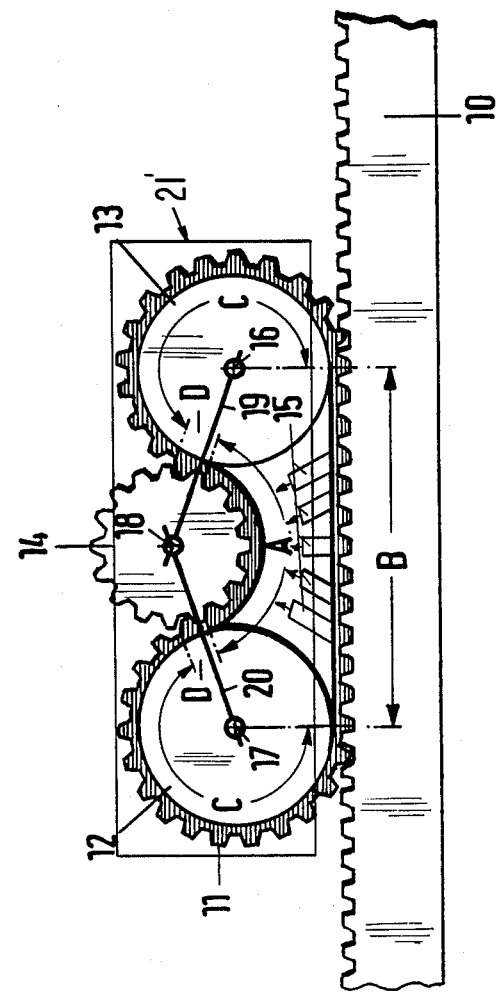
FIG. 1 is a schematic view of a motion conversion drive in accordance with the present invention.

The drive device illustrated in FIG. 1 comprises substantially a gear rack 10, an endless toothed belt 11, two deflection rollers 12 and 13, as well as a drive gear 14. These elements are driven by an electric motor in a conventional way. The drive belt 11 is pressed via deflection rollers 12 and 13 into the teeth of the gear rack 10. Thereby a sufficient engagement of the toothed belt 11 into the gear rack 10 is ensured over a length B. The engagement of the drive gear wheel 14 into the toothed belt 11 occurs in the region A. A further region designated as C provides that the toothed belt 11 is resting force transmittingly on the circumference of the deflection roller 12 or, respectively, 13. Only in the region designated D is a free stretching of the toothed belt 11 possible. However, this region, as can be clearly recognized from the drawing, can be reduced to zero for practical purposes such that free stretching of the toothed belt 11 can be excluded. In order to achieve this, it is only required that the drive gear wheel 14 is disposed relative to the deflection rollers 12 and 13 such that it comes to rest very deeply between the deflection rollers 12 and 13. In the region C, a slippage is only then possible if the rest friction between the back of the toothed belt 11 and the deflection roller 12 or, respectively, 13 is surpassed. This however can be excluded under normal operation by suitable selection of the frictional relationship. Only with occurrence of jolts is a short time duration slippage possible, which, however, leads to a reduction of the jolt energy. Following this, however, the desired precision conditions are again immediately present. Even the short term loss of coordination between the position of the drive gear wheel 14 and the position of the total drive device is restored immediately after the decreasing of the jolt load.

The drive means illustrated in FIG. 1 is associated with the great advantage that not only can the toothed belt together with the deflection rollers 12 and 13 be lifted off the gear rack 10 with no problem and because of this, several of such drive provisions can be operated on a single gear rack system, but also that the proper drive, along with the drive gear wheel 14, can be separated from the remaining parts of the drive without great demounting labor. This can be clearly recognized from FIG. 1. Of course, systems with several tracks can also be employed with the drive device described above. For example, it is possible without further problems to operate a system with two or more gear racks 10 and a corresponding number of toothed belt drives.

Possible variations of the above described construction in principle can be obtained by providing a pressure means 15 in the engagement region B between the gear rack 10 and the toothed belt 11 in the area between the deflection rollers 12 and 13. The pressure means presses the toothed belt 11 from the back side against the gear rack 10. In order to decrease friction in this context, a plurality of air exit nozzles can be provided in the contact surface of the pressure means 15. These air exit nozzles set up an air cushion and thus substantially reduce the frictional effect. The pressure means 15 can also be substituted for completely or in part by contact rollers 15'. Thus, particularly in the running direction of the toothed belt 11, such contact rollers could be provided on both sides of the pressure means 15.

The axes 16 and 17 of the deflection rollers 13 or, respectively, 12, can be connected to each other via a frame 21' or linkage. A rigid frame can be employed, but a hinged linkage can also be used. For example, a hinged linkage can be constructed from the hinges 19 and 20, where these hinges can also be directly or indirectly connected with the axis 18 of the drive gear wheel 14. A loading of the axis 18 of the drive gear wheel 14 with a perpendicular force thereby effects a slight pressing apart of the axes 16 and 17 of the deflection rollers 12 and 13 as well as a deeper penetration of the drive gear wheel 14 into the intermediate space between the deflection rollers 12 and 13.

In order to have the device free from play, it is required that an optimum matching of the shape of the toothed belt 11 with regard to the gear rack 10 be provided. This is achieved by a perpendicular movability of the guide of the toothed belt provided in the pressing means 15. Contact pressure rollers or similar devices can provide a permanent concentrically acting compression force. Thus the full engagement region becomes effective independent of the position. The pressure means 15 and the contact pressure rollers can be disposed movable in perpendicular direction for example under the action of a spring force. In addition, the axes 16 and 17 can be disposed movable in a perpendicular direction. Thereby possible errors in the shape of the gear rack 10 can be balanced.

The drive gear wheel 14 can be provided axially at least on one side with a cylinder roller 21. The diameter of the cylinder roller 21 can be slightly larger than the head circle of the drive gear wheel 14. A direct contact of the cylinder roller 21 with the deflection rollers 12 and 13 is possible upon a corresponding deep penetration of the drive gear wheel 14 between the deflection rollers 12 and 13. Thus a limitation of the penetration of the drive gear wheel 14 into the intermediate space between the deflection rollers 12 and 13 is provided. The thus achieved direct drive of the deflection rollers 12 and 13 thus also activates the region C for the drive of the toothed belt.

The length of the gear rack 10 can be as desired. For this purpose, it is composed of individual pieces of suitable length, possibly under maintaining of certain spaces between individual sections of the gear rack, such that by the selection of correspondingly large or small distance, even production errors in the production of the gear rack can be essentially balanced.

Preferably toothed belts are employed which provide a so-called null interval, that is, they engage without play into the profile of the gear rack. However, divided gear rack profiles can also be employed, which are then pushed against each other such that a possibly present play and/or backlash becomes balanced.

Figure 2:
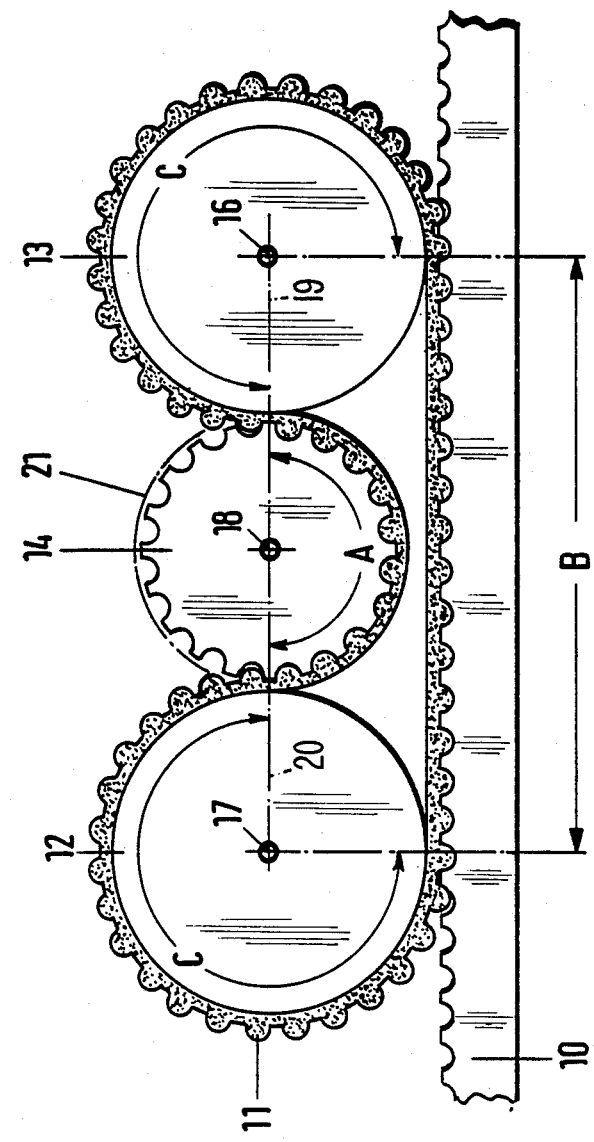
FIG. 2 is a view of a schematic representation of the drive for motion conversion with additional details, FIG. 3 corresponds to FIG. 1, but showing an alternate implementation of the nozzles 15, and FIG. 4 also corresponds to FIG. 1, but showing an alternate implementation of the pressure means in the form of rollers 15.
Figure 3:
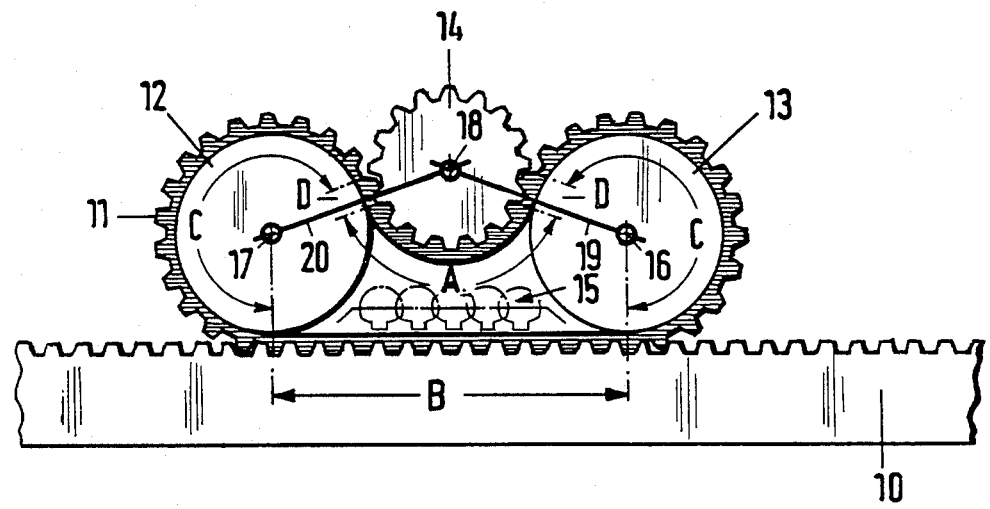
Figure 4:
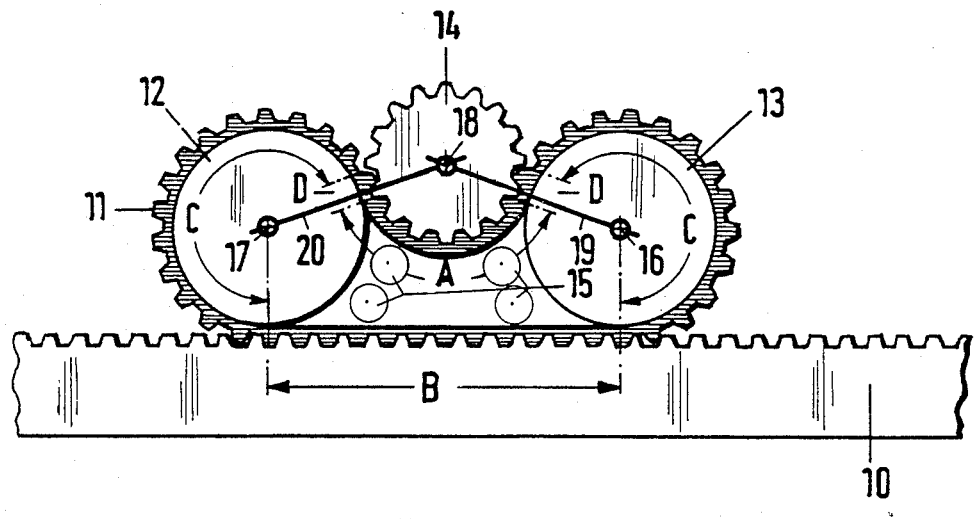

Upon use of tooth profiles with small flange angles, the lifting forces which would tend to make the toothed belt rise out of the gear rack profile can be kept very small. In particular, a tooth profile with semicircular tooth cross section as shown in FIG. 2 can be very advantages.

The above described drive device is suitable for numerically controlled machines. The device can be used with a lift length which is practically unlimited. Because of the small masses required in the device, a high acceleration can be achieved with a compensation for jolts. The device allows a component construction where several drive devices can be operated on a single gear rack system. The present system permits in addition the bridge building mode with twin drive (portal devices) without further construction. The device of the present invention is easy to service because of the ease of exchangeability of both the complete device as well as the individual parts of the device, and it further is associated with a high degree of effectiveness and a long lifetime.

The gear belt can have a single sided or double sided toothing in order to transmit circumferential forces without slippage. The belt body can comprise for example polyurethane or neoprene with fold fibers of steel or glass fiber yarn which are wound helically in the generally in standard length produced belts. The pull fibers provide the neutral bending plane. The length of the pull fibers is in general the effective length $L_W$ of the belt and its radius in the surrounding arc of the effective arc. When properly adjusted, toothed belts run without service with or without lubrication. With larger speeds, larger powers, larger pretensions and larger widths of the belt, noises are generated associated with the engagement of the teeth.

If the teeth of the gear of the toothed belt are of circular shape, their radius can be from about one fifth to one twentieth of the radius of the rollers and preferably from about one eighth to one fifteenth of the radius of the rollers. The number of the teeth of the toothed belt engaging the gear rack can be from about 5 to 50 and is preferably between about 10 and 20. The number of teeth of the drive gear can be from about 10 to 50 and is preferably between about 20 and 30. The diameter of the drive gear can be from about one half to the full diameter of the rollers.

The angle between the line connecting the first roller with the axis of the drive gear and the axis of the second roller with the axis of the drive gear is preferably larger than 135 degrees. The position of the axis of the drive gear is preferably between a tangential plane of the respective surface of the two rollers which is relatively remote from the gear rack and a plane going through the axes of the two rollers. The width of the gear rack can be from about one eighth of the radius of a roller to one half of the full size of such roller and is preferably between 0.25 and 0.5 of the radius of one of the rollers. The thickness of the belt can be from about one fifth to about one fiftieth and is preferably from about one tenth to about one twentieth of the radius of a roller. The average flange angle of the teeth is preferably between about 10 and 30 degrees.

The distance between the back side of the toothed belt in the area between the two rollers at their closest distance is preferably between one sixteenth and the size of the radius of the roller and preferably from about one quarter to three quarters of the radius of a roller.

It will be understood that each of the elements described above, or two or more together, may also find a useful application in other types of drives and motion conversion procedures differing from the types described above.

While the invention has been illustrated and described as embodied in the context of a drive for backlash-free conversion of motion, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A drive transmission for backlash-free mechanical energy transfer between rotation and linear motion comprising a first deflection roller;
   a second deflection roller disposed in parallel relative to the first deflection roller;
   a drive gear having an axis disposed about in parallel relative to the direction of the deflection rollers and disposed at a closer distance relative to each roller as compared to the distance between the two rollers;
   an endless toothed belt surrounding under tension with its back side at least over an angle of about 180 degrees the surface of each of the two rollers in a friction biased force transmitting way and engaging with its front side the drive gears such that the endless belt at its back side in the area of the contact with the drive gear and most remote from the two rollers is disposed between a plane spanned by the axes of the two rollers and a tangential plane spanned by the two rollers at a location going in the direction from the gear axis to the contacting of the toothed belt with the drive gear;
   a toothed rack disposed relatively close to said tangential plane and having its teeth directed toward the tangential plane for engagement with the toothed belt such that only a relatively small section of the toothed belt is not provided with a positive locking or force transmitting support; a press-on stage disposed in the engagement region between the toothed belt and the toothed rack, which presses the toothed belt from its backside into the teeth of the toothed rack and which is provided with air nozzles providing for an air cushion at a contacting surface thereof.

2. The drive transmission for backlash-free mechanical energy transfer according to claim 1 wherein the toothed rack runs quickly and repeatably in an adjustment direction of a tool and is in constant engagement with the toothed belt and where arcuate guides are provided, which maintain the toothed belt in such engagement with the drive gear that a certain section receives the load generated by the toothed rack and that only certain short second sections are without engagement with the teeth or without back support.

3. The drive transmission for backlash-free mechanical energy transfer according to claim 1 wherein the drive gear is limited in axial direction at least on one side by a cylinder roller with slightly larger diameter than an addendum circle of the drive gear and where said cylinder roller rolls on one of the deflection rollers.

4. The drive transmission for backlash-free mechanical energy transfer according to claim 1 wherein the axes of the deflection rollers are connected to each other via a frame.

5. The drive transmission for backlash-free mechanical energy transfer according to claim 4 wherein the frame is rigid, but movable to different height levels.

6. The drive transmission for backlash-free mechanical energy transfer according to claim 1 wherein a hinged frame is employed allowing for changing the distances between the axes of said rollers.

7. The drive transmission for backlash-free mechanical energy transfer according to claim 1 wherein the axis of the drive gear is connected to a frame.

8. The drive transmission for backlash-free mechanical energy transfer according to claim 1 wherein the teeth of the toothed belt have small gearing angles.

9. The drive transmission for backlash-free mechanical energy transfer according to claim 1 wherein the toothed belt is provided with teeth having essentially convex semicircular cross-sections.

10. The drive transmission for backlash-free mechanical energy transfer according to claim 1 wherein the diameter of the drive gear is from about 0.5 to 1 times the diameter of the deflection rollers.

11. A drive transmission for backlash-free mechanical energy transfer between rotation and linear motion comprising
    a gear drive having a rotation axis;
    a first deflection roller having a rotation axis and disposed neighboring to the gear drive;
    a second deflection roller having a rotation axis and disposed neighboring to the gear drive such that the angle between lines providing a nearest connection between the gear drive axis and the first roller axis and the gear drive axis and the second roller axis form an obtuse angle;

an endless toothed belt running with its back side in rolling contact with the respective rollers and where one belt connection between the rollers is with its front side engaging the teeth of the gear drive such that the above recited lines approximately correspond to a transition of engagement of the toothed belt between the gear drive and a respective roller and where the second belt connection between the rollers runs with the back side of the belt approximately along a tangential plane jointly defined by the surfaces of the two rollers;

a gear rack engaging the front side of the toothed belt in an area corresponding to the belt's motion along said tangential plane; and means pressing the toothed belt against the gear rack in the area of the tangential plane between the surfaces of the rollers, which means pressing the toothed belt is provided by an air flow exiting from nozzles.

12. A drive transmission for backlash- free mechanical energy transfer between rotation and linear motion comprising a gear drive having a rotation axis;

a first deflection roller having a rotation axis and disposed neighboring to the gear drive;

a second deflection roller having a rotation axis and disposed neighboring to the gear drive such that the angle between the lines providing a nearest connection between the gear drive axis and the first roller axis and the gear drive axis and the second roller axis form an abtuse angle;

an endless toothed belt running with its back side in rolling contact with the respective rollers and where one belt connection between the rollers is with its front side engaging the teeth of the gear drive such that the above recited lines approximately correspond to a transition of engagement of the toothed belt between the gear drive and a respective roller and where the second belt connection between the rollers runs with the back side of the belt approximately along a tangential plane jointly defined by the surface of the two rollers;

a gear rack engaging the front side of the toothed belt in an area corresponding to the belt's motion along said tangential plane; and means pressing the toothed belt against the gear rack in the area of the tangential plane between the surfaces of the rollers, which means pressing the toothed belt is provided by support rollers having an axis running approximately in parallel with the axis of the deflection rollers.

13. Drive device for backlash-free conversion of a rotary motion into a linear motion with the aid of a toothed belt and a drive gear engaging the toothed belt, where at least one gear rack is present running in a desired motion direction, where the gear rack is constantly engaging the toothed belt, where arcuate guides are provided on two sides of the drive gear, which arcuate guides maintain the toothed belt in such engagement with the gear rack that a certain section assumes the load and only a short define section of the toothed belt remains without engagement with a guide or counter teeth, characterized in that the endless loop of the toothed belt surrounds under tension with its back side under frictional contact, and force transmittingly, two deflection rollers and a drive gear engages the toothed belt from the side of the loop remote relative to the gear rack such that only a negligibly small section of the toothed belt is not provided with a positive locking or force- transmitting support, and contact rollers are disposed against the rear side of the toothed belt for maintaining the belt against the gear rack.

14. A drive transmission for backlash-free mechanical energy transfer between rotation and linear motion comprising a first deflection roller;

a second deflection roller disposed in parallel relative to the first deflection roller;

a drive gear having an axis disposed about in parallel relative to the direction of the deflection rollers and disposed at a closer distance relative to each roller as compared to the distance between the two rollers;

an endless toothed belt surrounding under tension with its back side at least over an angle of about 180 degrees the surface of each of the two rollers in a friction biased force transmitting way and engaging with its front side the drive gears such that the endless belt at its back side in the area of the contact with the drive gear and most remote from the two rollers is disposed between a plane spanned by the axes of the two rollers and a tangential plane spanned by the two rollers at a location going in the direction from the gear axis to the contacting of the toothed belt with the drive gear;

a toothed rack disposed relatively close to said tangential plane and having its teeth directed toward the tangential plane for engagement with the toothed belt such that only a relatively small section of the toothed belt is not provided with a positive locking or force transmitting support;

a press-on stage disposed in the engagement region between the toothed belt and the toothed rack, which presses the toothed belt from its backside into the teeth of the toothed rack and wherein contact pressure generating rollers are provided for maintaining the toothed belt disposed at the toothed rack.

* * * * *